US011957178B2

(12) United States Patent
Arminak

(10) Patent No.: US 11,957,178 B2
(45) Date of Patent: Apr. 16, 2024

(54) AEROSOL ACTUATOR

(71) Applicant: APackaging Group LLC, Azusa, CA (US)

(72) Inventor: Armin Arminak, Pasadena, CA (US)

(73) Assignee: APACKAGING GROUP LLC, Azusa, CA (US)

( * ) Notice: Subject to any disclaimer, the term of this patent is extended or adjusted under 35 U.S.C. 154(b) by 0 days.

(21) Appl. No.: 18/055,122

(22) Filed: Nov. 14, 2022

(65) Prior Publication Data

US 2023/0148674 A1 May 18, 2023

Related U.S. Application Data

(60) Provisional application No. 63/279,533, filed on Nov. 15, 2021.

(51) Int. Cl.

| | |
|---|---|
| ***A24F 40/485*** | (2020.01) |
| ***A24F 40/50*** | (2020.01) |
| ***B05B 11/00*** | (2023.01) |

(52) U.S. Cl.

CPC ............ *A24F 40/485* (2020.01); *A24F 40/50* (2020.01); *B05B 11/00* (2013.01)

(58) Field of Classification Search

CPC ........ A24F 40/485; A24F 40/50; B05B 11/00; B65D 83/206

USPC ..................................................... 222/153.13

See application file for complete search history.

(56) References Cited

U.S. PATENT DOCUMENTS

| | | | | |
|---|---|---|---|---|
| 3,874,562 A | 4/1975 | Hazard | | |
| 3,907,174 A | 9/1975 | Steiman | | |
| 4,607,765 A | 8/1986 | Ruscitti | | |
| 4,875,604 A | 10/1989 | Czech | | |
| 5,388,730 A | 2/1995 | Abbott et al. | | |
| 5,673,821 A | 10/1997 | Davis et al. | | |
| 7,014,127 B2 | 3/2006 | Valpey, III | | |
| 7,487,891 B2 | 2/2009 | Yerby et al. | | |
| D594,747 S | 6/2009 | Moretti | | |
| D595,570 S | 7/2009 | Moretti | | |
| 7,601,681 B2 | 10/2009 | Smets | | |
| 7,611,032 B2 * | 11/2009 | Brunerie | .............. | B65D 83/206 222/402.11 |

(Continued)

FOREIGN PATENT DOCUMENTS

| | | |
|---|---|---|
| CN | 103612823 A | 3/2014 |
| CN | 103708093 A | 4/2014 |

(Continued)

*Primary Examiner* — Vishal Pancholi
*Assistant Examiner* — Robert K Nichols, II
(74) *Attorney, Agent, or Firm* — Cislo & Thomas, LLP

(57) ABSTRACT

An aerosol actuator having an operating cap and a base cap, where the operating cap interfaces with the aerosol valve of an aerosol dispenser and is rotatable between a locked position which prohibits dispensing of the aerosol product and an unlocked position that allows dispensing of an aerosol product via tilting action of the operating cap, is presented. The operating cap is equipped with a plurality of fins positionable over a plurality of blocking surfaces and slots in the base cap, where rotation in one direction locks the operating cap and prevents actuation and consequent dispensing of an aerosol product and rotation in an opposite direction allows for operation of the cap and consequently the dispensing of an aerosol product.

9 Claims, 10 Drawing Sheets

(56) References Cited

U.S. PATENT DOCUMENTS

| | | | | |
|---|---|---|---|---|
| 7,757,905 | B2 * | 7/2010 | Strand .................. | B65D 83/206<br>222/404 |
| 8,100,298 | B2 * | 1/2012 | Marquardt ............. | B65D 83/22<br>222/402.11 |
| 8,127,968 | B2 | 3/2012 | Yerby et al. | |
| 10,335,816 | B1 | 7/2019 | Arminak | |
| 10,544,418 | B2 | 1/2020 | Van Heeke | |
| 10,577,169 | B2 * | 3/2020 | Bodet .................. | B65D 83/205 |
| 2003/0116588 | A1 | 6/2003 | Santagiuliana | |
| 2006/0043117 | A1 | 3/2006 | Law et al. | |
| 2008/0179347 | A1 | 7/2008 | Yerby et al. | |
| 2009/0008413 | A1 | 1/2009 | Choi et al. | |
| 2012/0104048 | A1 | 5/2012 | Tseng | |
| 2013/0277397 | A1 | 10/2013 | Erickson et al. | |
| 2014/0144429 | A1 | 5/2014 | Wensley | |
| 2014/0239021 | A1 | 8/2014 | Xufeng | |
| 2018/0118444 | A1 | 5/2018 | Bodet et al. | |

FOREIGN PATENT DOCUMENTS

| | | | |
|---|---|---|---|
| EP | 1389491 | A1 | 2/2004 |
| EP | 2970974 | | 8/2017 |
| EP | 2925395 | | 3/2019 |
| JP | 6095678 | | 3/2017 |
| JP | 6885976 | | 6/2021 |
| KR | 102292287 | B1 | 8/2021 |

* cited by examiner

AEROSOL ACTUATOR

CROSS-REFERENCES TO RELATED APPLICATION

This application claims the benefit of U.S. Provisional Application Ser. No. 63/279,533, filed Nov. 15, 2021 and entitled "Aerosol Dispenser Cap," which is incorporated herein by this reference.

FIELD OF THE INVENTION

The invention relates to dispensing of an aerosol product and more particularly to an improved tilt-type aerosol actuator assembly having a cap rotatable relative to a base for enabling and disabling dispensing of an aerosol product from an aerosol container.

BACKGROUND OF THE INVENTION

An aerosol dispenser comprises an aerosol container filled with an aerosol product and an aerosol propellent. The aerosol container is equipped with a tilt-valve to control the discharge of the aerosol product and propellant. An aerosol actuator assembly is an interface device typically comprising an operating cap and a base that attaches to the container and can be actuated by a user to control the flow of an aerosol product through the aerosol valve.

The aerosol valve includes a biasing spring which biases the valve into a closed position. A valve stem cooperates with the aerosol valve for opening the valve. An operating cap engages with the valve stem and via tilting action of the actuator, opens and closes the valve. The operating cap will typically include a spray nozzle for directing the dispensed aerosol product.

One problem commonly associated with tilt-type aerosol dispensers is that of accidental discharge of the contents of the container because of inadvertent tilting of the valve stem. Frequently, after the purchase of an aerosol dispenser, a protective cap that prevents inadvertent operation is thrown away and the aerosol actuator left unprotected. Subsequently, if the dispenser is packed into luggage or otherwise packed with other articles, sufficient force may be applied to the operating cap to tilt the cap and cause operation of the aerosol dispenser valve.

Although existing aerosol actuator assemblies have proven to be effective, there remains room for improvement in the art. What is needed is a cost effective and relatively simple aerosol actuator assembly where the operating cap can be selectively moved from a locked position which prohibits the dispensing of product to an unlocked position that allows the dispensing of an aerosol product. Prior art, selectively lockable aerosol actuator assemblies have often proven to be overly complex and too costly for mass production.

SUMMARY OF THE INVENTION

The present invention solves the problems of the prior art by providing an aerosol actuator having an operating cap and a base cap, where the operating cap interfaces with the aerosol valve of an aerosol dispenser and is rotatable between a locked position which prohibits dispensing of the aerosol product and an unlocked position that allows dispensing of the aerosol product via tilting action of the operating cap, which causes tilting or opening of the aerosol valve. The operating cap includes a plurality of fins that are rotatable over a plurality of slots and blocking surfaces disposed in the base cap.

In the exemplary embodiment, in the locked position, the operating cap is rotated clockwise such that the fins are positioned over the blocking surfaces which thereby prevent depression or operation of the cap. In the unlocked position, the operating cap is rotated counterclockwise such that the fins are disposed above the slots in the base cap, thereby allowing downward depression of the cap. The fins and slots are configured such that downward depression of an operating surface on one side of the operating cap causes tilting of the cap, which thereby causes tilting of the aerosol valve to which the operating cap is attached. It will be appreciated that the operating cap and base cap may be configured such that the direction of rotation for unlocking and locking of the operating cap may be reversed from that of the exemplary embodiment. The base cap is configured so as to be attachable via a press fit to either a lip of an aerosol container or to the lip of an aerosol valve cup.

Comprising only two components, i.e., the operating cap and the base cap, the aerosol actuator of the present invention may be manufactured from plastic materials at relatively low cost and in high volume. Being fabricated entirely from plastic materials, the aerosol actuator of the present invention is well-suited for recycling.

The above and other advantages of the aerosol actuator of the present invention will be described in more detail below.

DETAILED DESCRIPTION OF THE PREFERRED EMBODIMENT

Figure 1:
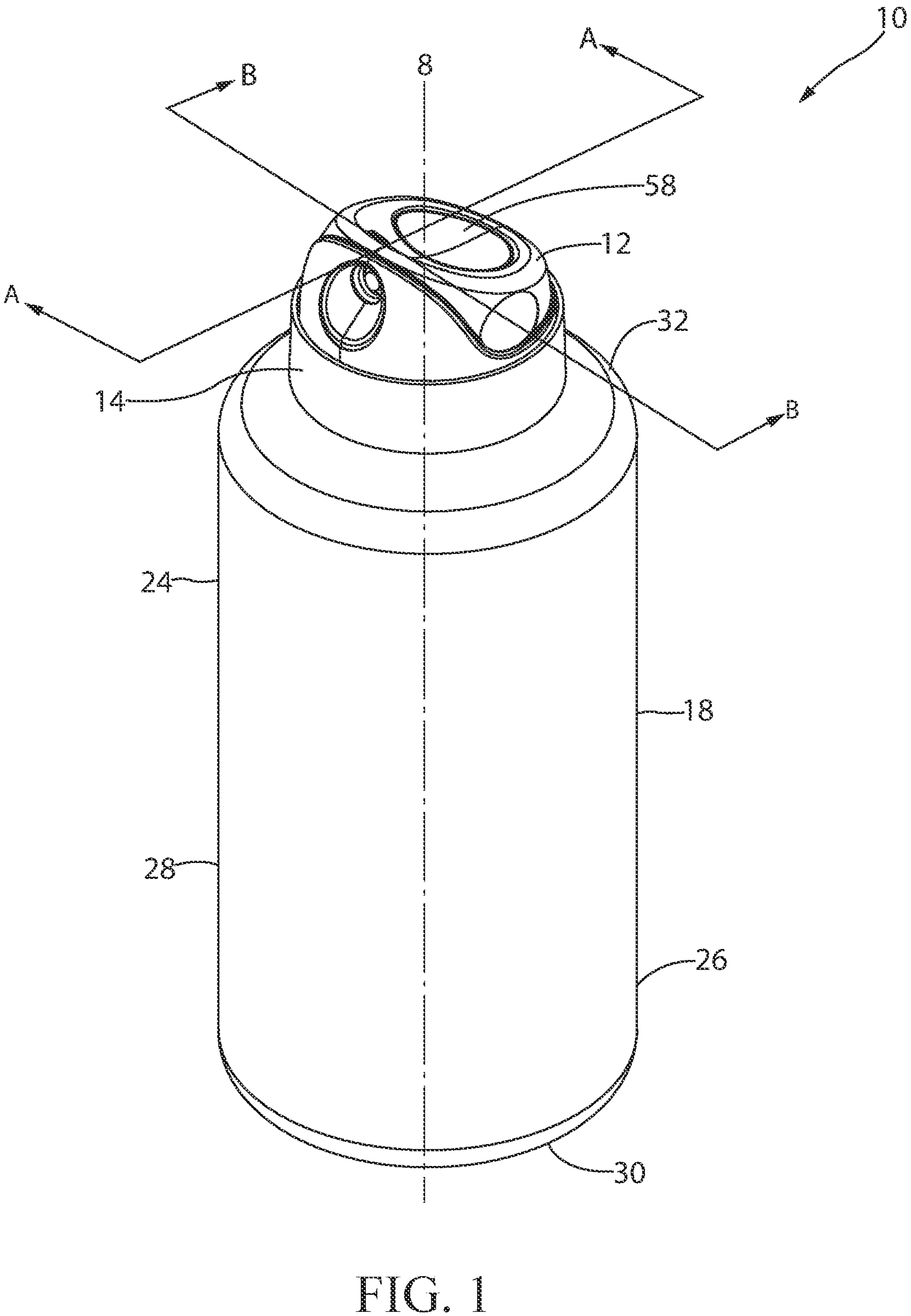
FIG. 1. is a perspective view of an aerosol actuator of the present invention.

With reference to FIG. 1, the aerosol actuator assembly 10 comprises an operating cap 12 and a base cap 14. The operating cap 12 is rotatably attached to the base cap 14. The base cap 14 is secured to an aerosol container 18. The aerosol container 18 has a longitudinal axis of symmetry 8.

Figure 1A:
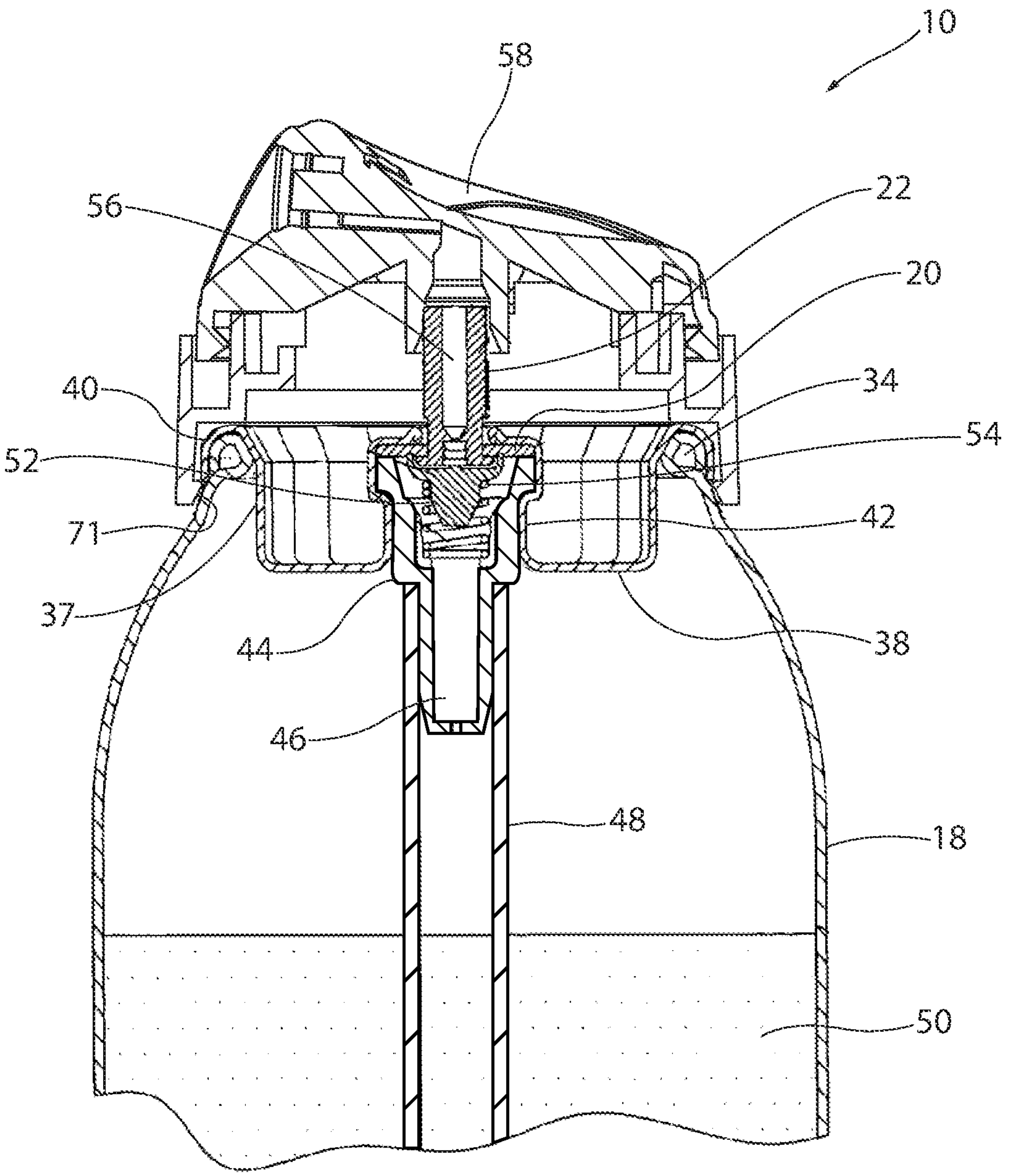
FIG. 1A is a cross-sectional view of the aerosol actuator of FIG. 1 mounted on an aerosol container.
Figure 2:
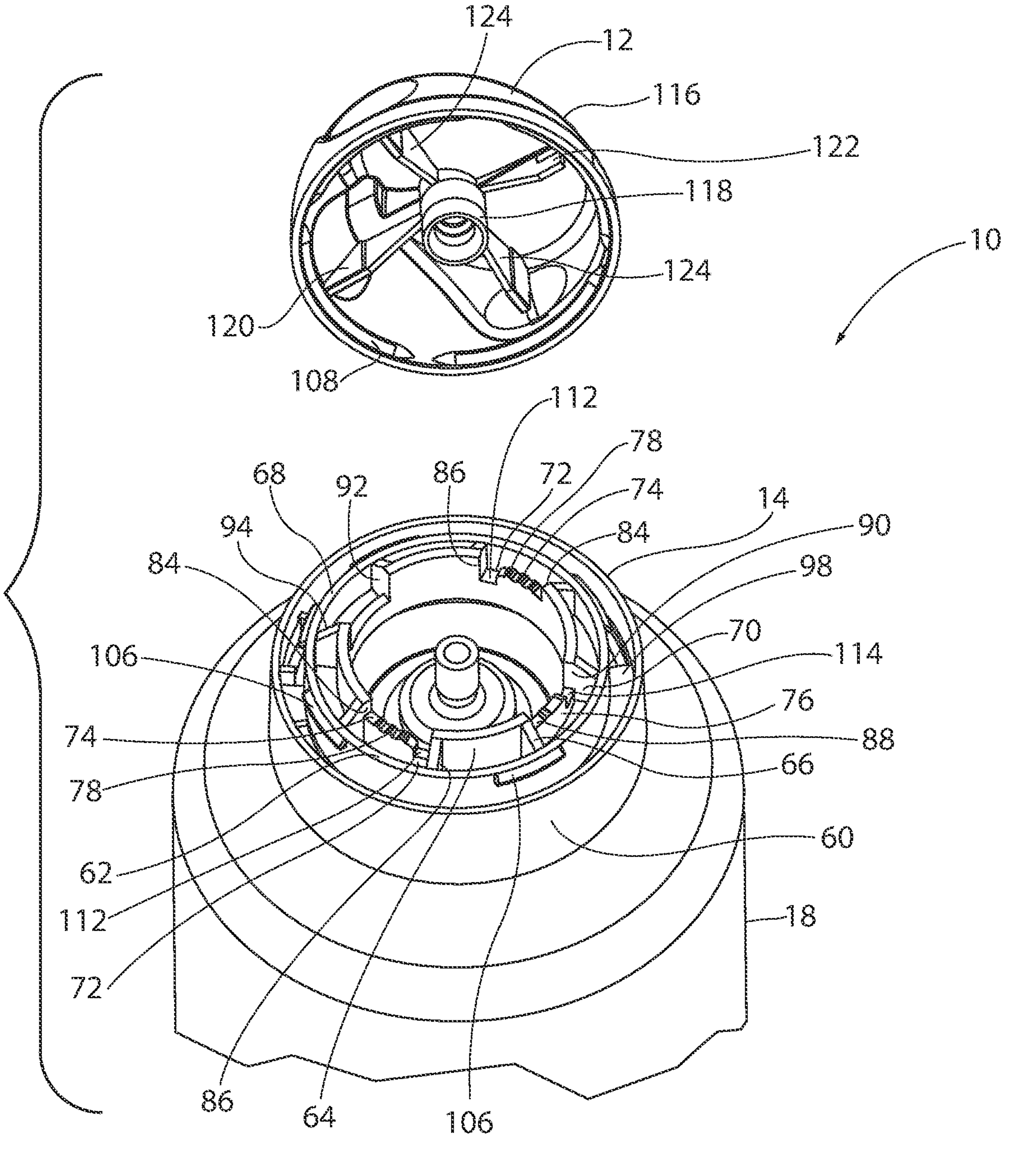
FIG. 2 is an exploded perspective view of the aerosol actuator of FIG. 1.
Figure 3A:
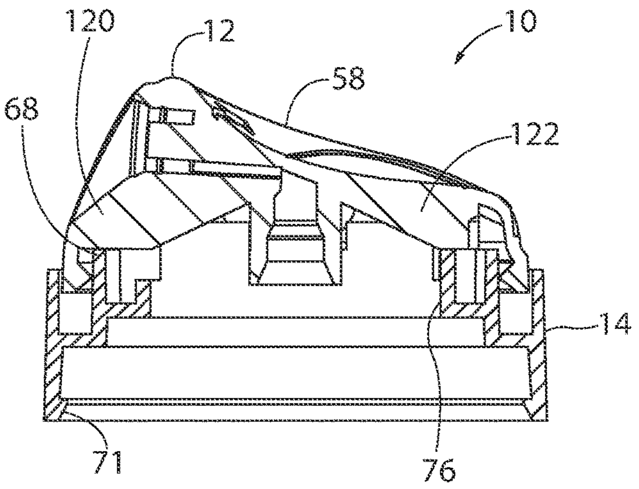
FIG. 3A is a cross-sectional view, taken along the line A-A of FIG. 1, of the aerosol actuator of FIG. 1, showing the front and rear fins of the operating cap positioned above the corresponding blocking surfaces of the base cap when the operating cap is rotated to the locked position.
Figure 3B:
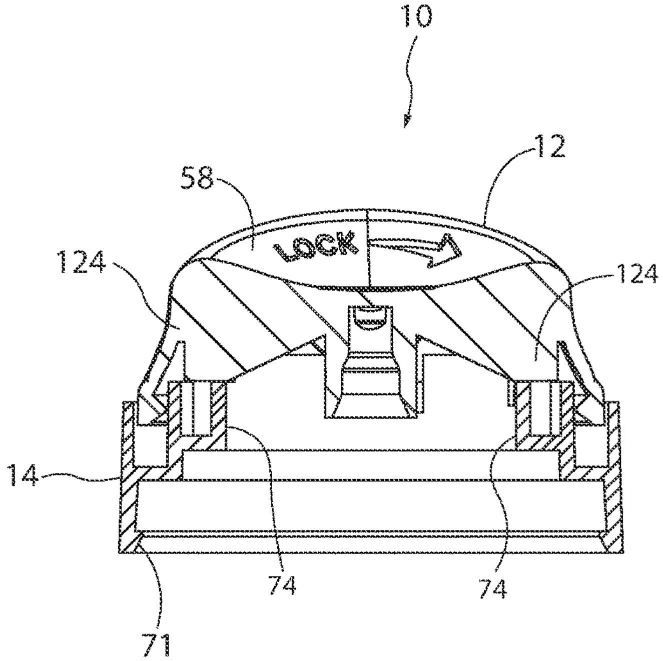
FIG. 3B is a cross-sectional view, taken along the line B-B of FIG. 1, of the aerosol actuator of FIG. 1, showing the side fins of the operating cap positioned above the corresponding blocking surfaces of the base cap when the operating cap is rotated to the locked position.

With reference to FIGS. 1 and 1A, the construction and operation of a conventional aerosol container 18 is described as an aid in understanding the function of the aerosol actuator assembly 10 of the present invention. The aerosol container 18 is equipped with an aerosol valve 20 having a valve stem 22. The aerosol valve 20 controls the flow of the aerosol product 50 through the valve stem 22. The aerosol product 50 and the aerosol propellant (not shown) are stored within the aerosol container 18.

For the purpose of this disclosure a downwards direction refers to a direction along the longitudinal axis of symmetry 8 towards a closed or bottom end 26 of the aerosol container 18 and an upwards direction refers to a direction along the longitudinal axis of symmetry 8 towards the aerosol valve 20 installed in the aerosol container 18.

The aerosol container 18 has a top end 24 and the bottom end 26 with a cylindrical sidewall 28 therebetween. The bottom end 26 is closed out by an end-wall 30. The top end 24 tapers radially inwardly to form a neck 32 terminating in a bead 34. The bead 34 defines an opening 36 in the aerosol container 18 for receiving a mounting cup 38. The mounting cup 38 includes a peripheral rim 40 for sealing to the bead 34 of the aerosol container 18. The mounting cup 38 includes a turret 42 for receiving the aerosol valve 20.

The aerosol valve 20 includes a valve body 44 secured to the turret 42 of the mounting cup 38. The valve body 44 defines an internal valve cavity 46 in fluid communication with the aerosol container 18 through a dip tube 48. The aerosol valve 20 includes a valve element 52 positioned within the internal valve cavity 46. A biasing spring 54 biases the valve element 52 into a normally closed position to inhibit the flow of the aerosol product 50 through the valve stem 22.

The aerosol valve 20 is configured such that tilting of the valve stem 22 by an external force applied to the valve stem 22 causes a gap to open between the valve stem 22 and the valve element 52, which thereby allows aerosol product 50 to exit the aerosol container 18 through a flow passage 56 in the valve stem 22. Upon removal of the external force from the valve stem 22, the biasing spring 54 causes the valve element 52 to seal against the valve stem 22, thereby preventing the aerosol product 50 from exiting the aerosol container 18.

With reference to FIGS. 1 through 11 the aerosol actuator assembly 10 of the present invention is described herein. The aerosol actuator assembly 10 comprises the operating cap 12 and the base cap 14, which are configured such that the operating cap 12 is rotatable relative to the base cap 14 between an unlocked position (see FIGS. 4A, 4B and 7) and a locked position (see FIGS. 3A, 3B and 6). When the operating cap 12 is rotated to the unlocked position, the operating cap 12 is tiltable relative to the base cap 14 for actuating the aerosol valve 20 to dispense the aerosol product 50 from the aerosol container 18. (See FIG. 5.) Tilting of the operating cap 12 occurs when a user presses downwardly on an actuation surface 58 of the operating cap 12, when the operating cap is in the unlocked position. (See FIGS. 4A, 4B and 7.) When the operating cap 12 is rotated to the locked position (see FIGS. 3A, 3B and 6), tilting of the operating cap 12 is blocked.

With reference to FIGS. 1-7 and 10, the base cap 14 includes an outer cylindrical sidewall 60, a middle cylindrical sidewall 62 and an inner cylindrical sidewall 64. The outer cylindrical sidewall 60, the middle cylindrical sidewall 62, and the inner cylindrical sidewall 64, are coaxial with the longitudinal axis of symmetry 8 of the aerosol container 18. Disposed between the middle cylindrical sidewall 62 and the inner cylindrical sidewall 64 are a plurality of buttresses 66 which are connected to the side walls and serve to stiffen the sidewalls.

Formed between the outer cylindrical sidewall 60 and the middle cylindrical sidewall 62 are a plurality of gusset portions 98, which function to interconnect the outer cylindrical sidewall 60 with the middle cylindrical sidewall 62.

A top surface of the middle cylindrical side wall 62 between a clockwise stop surface 92 and a counterclockwise stop surface 94 is defined as the forward shelf 68. Formed in the inner cylindrical sidewall 64 is a rear slot 70 and side slots 72. Each of the side slots 72 has a bottom surface 112. (See FIG. 2.) The rear slot 70 has a bottom surface 114. (See FIG. 2.) In the exemplary embodiment, the depth of bottom surfaces 112 of the side slots 72 and the bottom surface 114 of the rear slot 70 and are the same. For the purposes of this disclosure, the depth of bottom surfaces 112 of the side slots 72 and the bottom surface 114 of the rear slot 70 and the depth of the forward shelf 68 is defined the vertical distance, downwardly, from a plane 142 defined as being coplaner with the upper circumference of the inner cylindrical wall 64 of the base cap 12. In the exemplary embodiment, the depth of the forward shelf 68 is less than that of the bottom surface 112 of the side slots 72 of the bottom surface 114 of the rear slot 70.

Adjacent to the side slots 72 are side blocking portions 74. Formed at an end of each side blocking portion 74 is a clockwise stop surface 84, where the clockwise stop surface 84 limits clockwise rotation of the operating cap 12. Formed at one of the walls defining each of the side slots 72 is a counter-clockwise stop surface 86, where the counter-clockwise stop surface 86 limits counterclockwise rotation of the operating cap 12.

Similarly, formed adjacent to the rear slot 70 is a rear blocking portion 76. Formed at an end wall of the rear blocking portion 76 is a clockwise stop surface 88, where the clockwise stop surface 88 functions to limit clockwise rotation of the operating cap 12. Formed at one of the walls defining rear slot 70 is a counterclockwise stop surface 90, where the counterclockwise stop surface 90 serves to limit counterclockwise rotation of the operating cap 12.

Formed on a top surface 80 of each side blocking portion 74 and a top surface 82 of the rear blocking portion 76 are a plurality of locking protrusions 78. The forward shelf 68 of the base cap 14 also includes a clockwise stop surface 92 and a counterclockwise stop surface 94, where the counter-clockwise stop surface 94 serves to limit counterclockwise rotation on the operating cap 12 and the clockwise stop surface 92 serves to limit clockwise rotation of the operating cap 12.

The base cap 14 includes an annular projection 71 formed on an inner surface of outer cylindrical sidewall 60 and adjacent a lower edge and which extends radially inwardly. (See FIGS. 3A, 3B, 4A, 4B and 5.) The annular projection 71 snaps over the peripheral rim 40 (see FIG. 1A) of the mounting cup 38 and thereby secures the base cap 14 to the aerosol container 18. In other aerosol container configurations, the annular projection 71 may engage with the bead 34 of the aerosol container 18.

The base cap 14 further includes a plurality of annular protrusions 106 spaced about an exterior surface of the middle cylindrical sidewall 62. (See FIG. 2.) The plurality of annular protrusions 106 of the base cap 14 engage via a snap fit relationship with a plurality of mating angular protrusions 108 formed on an inner surface of the operating cap 12. (See FIG. 2.)

With reference to FIGS. 1-11 and particular reference to FIGS. 2, 8A, 8B and 9, the operating cap 12, includes a generally hollow, hemispherical body 116, a tubular portion 118 that is coaxial with the axis of symmetry 8 of the aerosol container 18, and four equally spaced fins, i.e. front fin 120, rear or rear fin 122 and side fins 124, extending radially outwardly from the tubular portion 118.

Figure 8A:
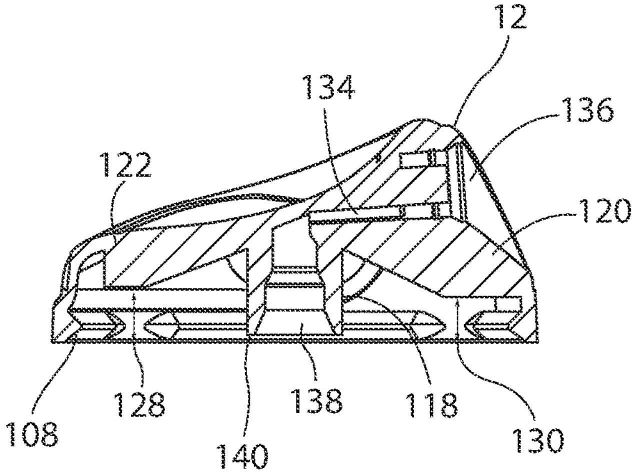
FIG. 8A is a cross section of the operating cap of FIG. 1 taken along the line A-A of FIG. 1.
Figure 8B:
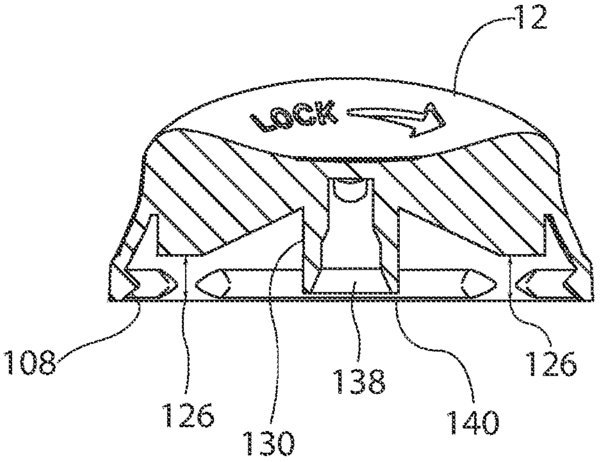
FIG. 8B is a cross section of the operating cap of FIG. 1 taken along the line B-B of FIG. 1.
Figure 9:
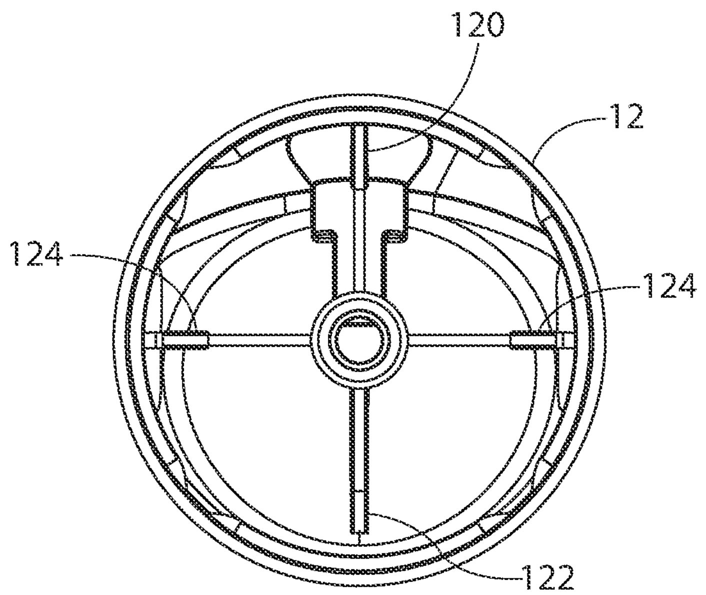
FIG. 9 is a bottom view of the operating cap of the aerosol actuator assembly of FIG. 1.
Figure 10:
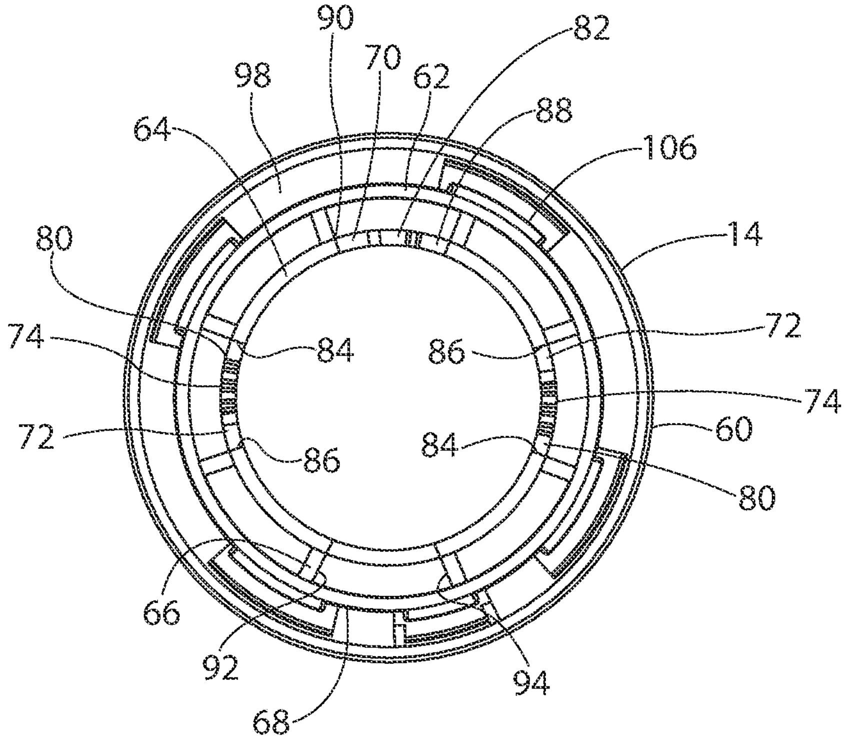
FIG. 10 is a top view of the base cap of the aerosol actuator assembly of FIG. 1.
Figure 11:
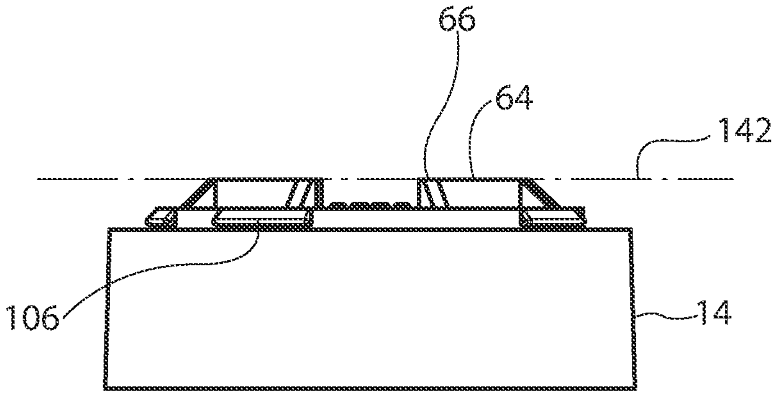
FIG. 11 is a side view of the base cap of the aerosol actuator assembly of FIG. 1.

With particular reference to FIGS. 1, 8A and 8B, each of the fins extends downwardly from the interior of the operating cap 12 to a specific height above a plane 146, the plane 146 being coplanar with a bottom circumference 148 of the operating cap 12. The front fin 120 has a height 130. The rear fin 122 has a height 128 and the side fins 124 have a height 126. (See FIG. 3B.) The height 128 of the rear fin 122 is greater than the height 130 of the front fin 120 and the height 126 of the side fins 124. The height 126 of the side fins 124 is greater than the height 130 of the front fin 120, but less than the height 128 of the rear fin 122.

The operating cap 12 further includes a nozzle flow passage 134 which has an exit orifice 136 at one end and connects to a flow passage 138 of the tubular portion 118 at another end. (See FIG. 8A.) The tubular portion 118 is configured at an open end 140 to engage with an outlet end of the aerosol valve 20.

As referenced, the plurality of angular protrusions 108 formed on the inner surface of the operating cap 12 snap over the plurality of annular protrusions 106 of the base cap 14. When the operating cap 12 is snapped into place on the base cap 14, the operating cap 12 is prevented from translating relative to the base cap 14, but it's free to rotate relative to the base cap 14 about a longitudinal axis coincident with the longitudinal axis 8 of the aerosol container 18.

As the aerosol valve 20 is spring loaded (see FIG. 1A) and attached to the operating cap 12 via a press fit between the tubular portion 118 of the operating cap 12 and the valve stem 22 of the aerosol valve 20, the operating cap 12 is biased in an upwards direction. With the operating cap 12 engaged with the base cap 14, in the exemplary embodiment, the operating cap 12 is rotatable, relative to the base, clockwise to a locked position or counterclockwise to an unlocked position.

With reference to FIGS. 2, 3A, 3B, 5 and 6, when the operating cap 12 is rotated fully clockwise, the side fins 124 rest upon the top surfaces 80 of the side blocking portions 74 (of the base cap 14) (see FIG. 3B) and abut the clockwise stop surfaces 84 (see FIG. 6) and the rear fin 122 rests upon the top surface 82 of the rear blocking portion 76 (see FIG. 3A) and abuts the clockwise stop surface 88. (See FIG. 6.) The front fin 120 rests on the forward shelf 68 and abuts the clockwise stop surface 92. In this position, downwards depression or tilting movement of the operating cap 12 is prevented. With depression or tilting of the operating cap 12 blocked, depression or tilting of the aerosol valve 20 is also blocked and consequently aerosol product 50 cannot be dispensed from the aerosol container 18.

The locking protrusions 78 on the top surfaces 80 of side blocking portions 74 and the top surface 82 of rear blocking portion 76, respectively, provide tactile feedback to a user as the operating cap 12 rotates. The locking protrusions 78 also function to prevent the side fins 124 and the rear fin 122 from inadvertently rotating counterclockwise and allowing the operating cap 12 to inadvertently move into the unlocked position.

With reference to FIGS. 2, 4A, 4B and 7, when the operating cap 12 is rotated fully counterclockwise into the unlocked position, the side fins 124 are positioned above the side slots 72 of the base cap 14 (see FIG. 4B) and abut the counterclockwise stop surfaces 86 (see FIG. 7) and the rear fin 122 is positioned above the rear slot 70 (see FIG. 4A) and abuts the counterclockwise stop surface 90. (See FIG. 7.) In the unlocked position, the front fin 120 rests upon the forward shelf 68 (see FIG. 4A) and abuts the counterclockwise stop surface 94. (See FIG. 7.)

Figure 4A:
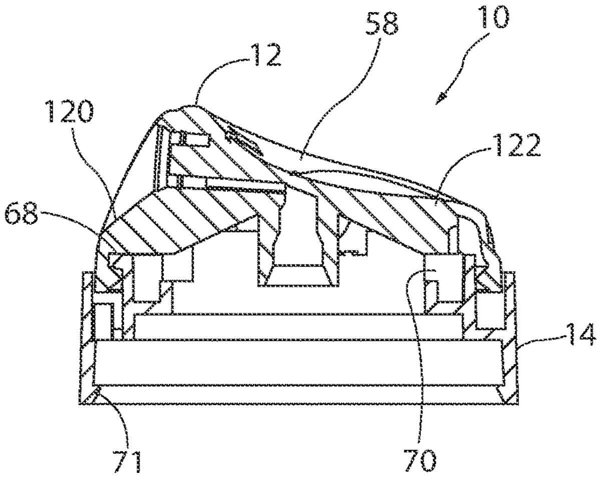
FIG. 4A is a cross-sectional view, taken along the line A-A of FIG. 1, of the aerosol actuator of FIG. 1, showing the front and rear fins of the operating cap positioned above the corresponding slots of the base cap when the operating cap is rotated to the unlocked position.
Figure 4B:
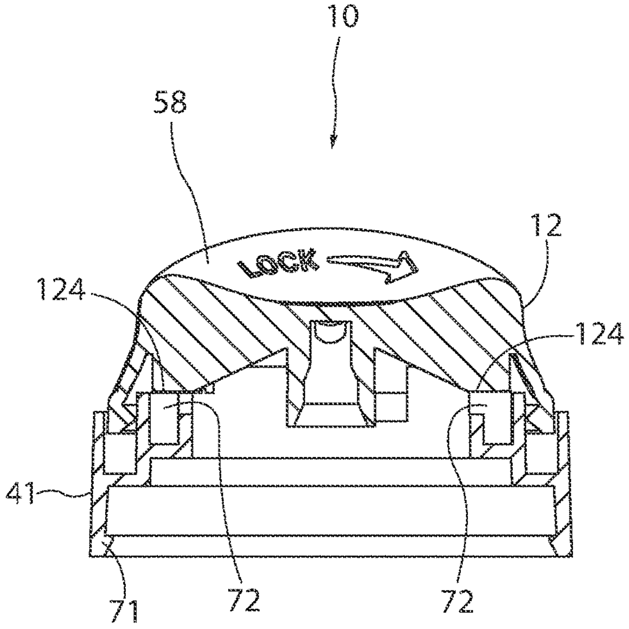
FIG. 4B is a cross-sectional view, taken along the line B-B of FIG. 1, of the aerosol actuator of FIG. 1, showing the side fins of the operating cap positioned above the corresponding slots of the base cap when the operating cap is rotated to the unlocked position.
Figure 5:
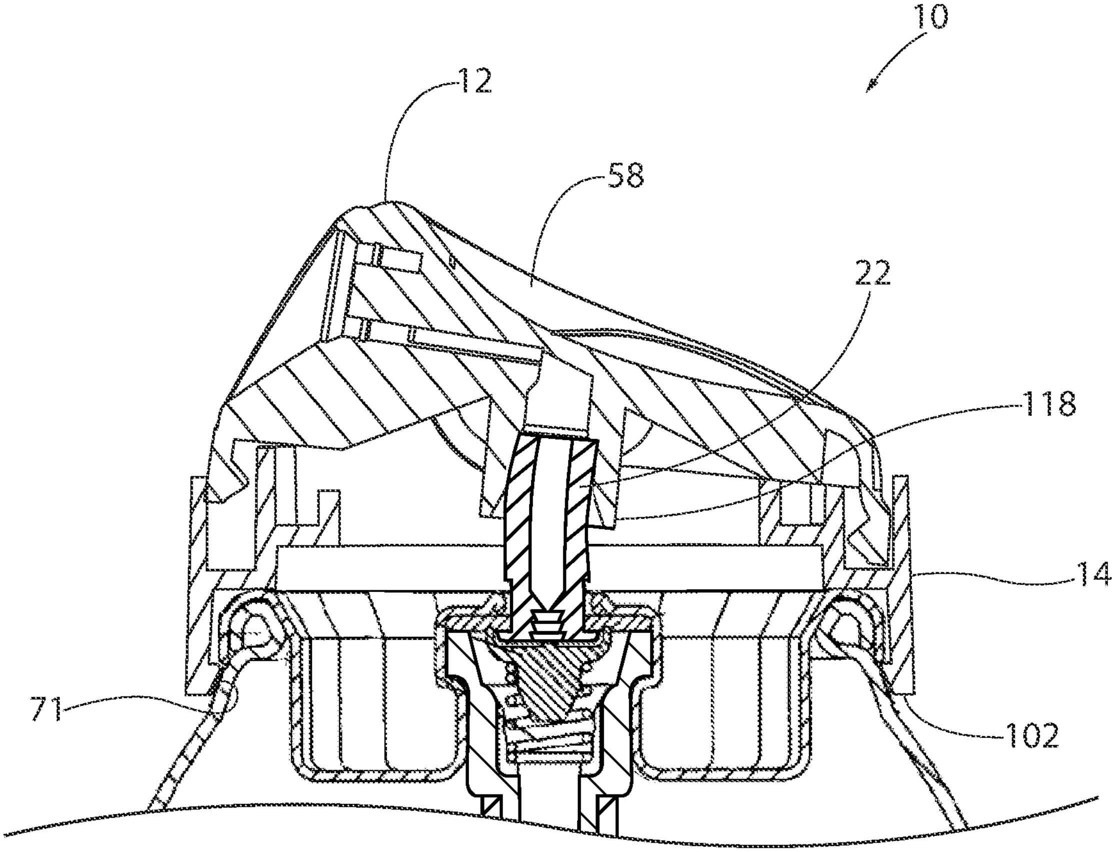
FIG. 5 is a cross-sectional view, taken along the line A-A of FIG. 1, showing the operating cap of the aerosol actuator of FIG. 1 in the depressed position.
Figure 6:
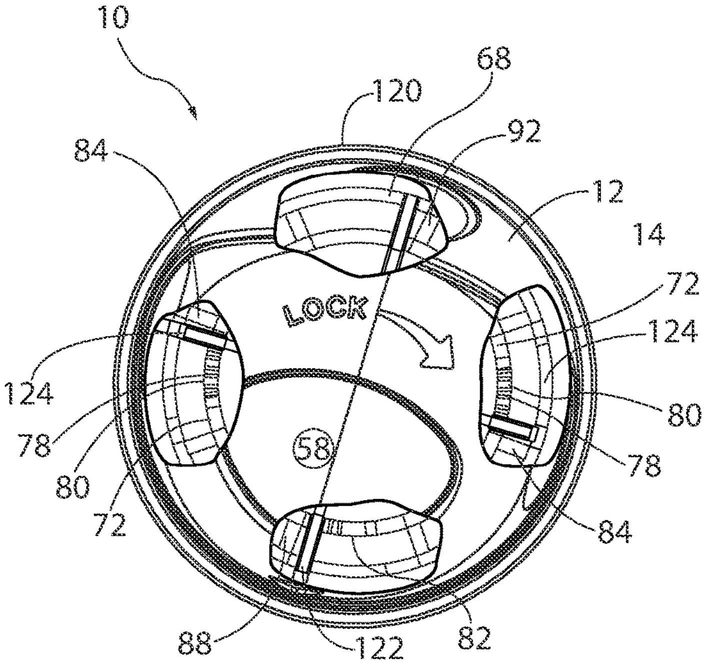
FIG. 6 is a top view, partially cut away, showing the fins of the operating cap of the aerosol actuator of FIG. 1, over the blocking portions of the base cap, when the operating cap is in the locked position.
Figure 7:
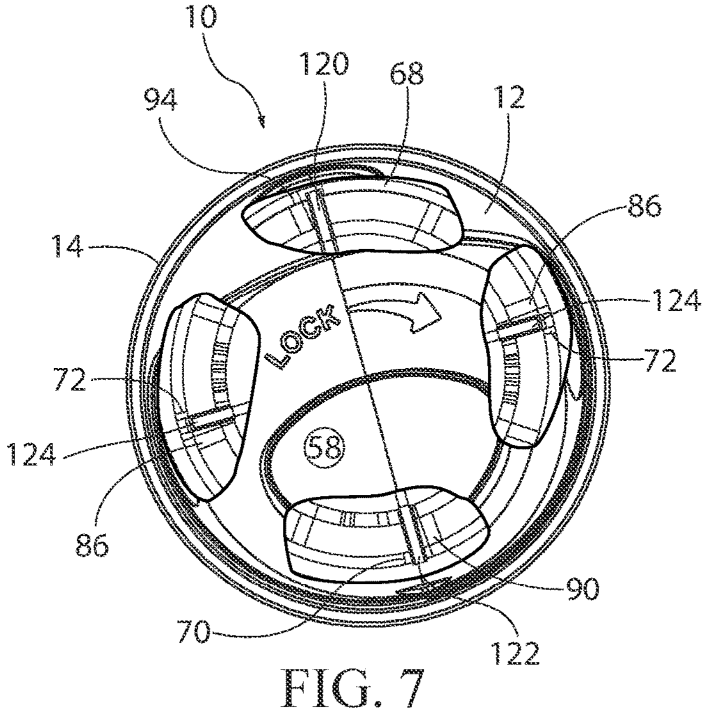
FIG. 7 is a top view, partially cutaway, showing the fins of the operating cap of the aerosol actuator of FIG. 1 over the slots of the base when the operating cap is in the unlocked position.

When the operating cap 12 is in the above-described unlocked position relative to the base cap 14, i.e. as shown in FIGS. 4A and 4B, downward pressure by a user on an actuation surface 58 of the operating cap 12 causes the operating cap 12 to tilt and thereby open the aerosol valve 20, i.e. the rear fin 122 moves downwardly in the rear slot 70 causing the operating cap to tilt and valve stem 22 of the aerosol valve 20 to tilt and thereby open the valve. Upon the removal of user pressure on actuation surface 58, the biasing spring 54 of the aerosol valve closes the valve and drives the operating cap 12 upwards.

In more detail, downward pressure on the actuation surface 58 of the operating cap 12 causes the front fin 120 to contact the forward shelf 68 and the rear fin 122 to depress until it contacts the bottom surface 114 of the rear slot 70. As the height 128 of the rear fin 122 is greater than the height 130 of the front fin 120 and the height 126 of the side fins 124, this results in the operating cap 12 tilting upon depression of actuation surface 58. Consequently, the tubular portion 118 of the operating cap 12 causes tilting of the valve stem 22 of the aerosol valve 20. Upon the valve stem 22 of the aerosol valve 20 being tilted, aerosol product under pressure in the aerosol container 18, flows through the nozzle flow passage 134 and the flow passage 138 of the operating cap 12 until it is dispensed from the exit orifice 136. After being depressed, upon release of the operating cap 12, the biasing spring 54 of the aerosol valve 20 biases the operating cap 12 upwardly, such that the operating cap 12 may subsequently be rotated clockwise into the locked position.

In the exemplary embodiment, in the unlocked position, the side fins 124 of the operating cap 12 are disposed above the side slots 72. The height of the side fins 124 are configured such that when the operating cap 12 is depressed, the side fins 124 will not contact the bottom surfaces 112 of the side slots 72 when the rear fin 122 abuts the bottom surface 114 of the rear slot 70.

In an alternative embodiment, the height of the side fins 124 may be configured such that upon downward depression of the operating cap 12, the side fins 124 contact the bottom surface 112 of the side slots 72 before the rear fin 122 contacts the bottom surface 114 of the rear slot 70. Upon the continued application of downward force, the operating cap 12 will rock about the side fins 124 until the rear fin 122 contacts the bottom surface 114 of the rear slot 70. This rocking action may create a more positive "feel" or "feedback" to a user of the aerosol actuator 10.

The operating cap and the base cap of the present invention may be injection molded from a wide variety of plastic materials of which polyethylene and polypropylene are two such materials. These materials are well-suited for low cost, high volume production. Other materials and methods of manufacture may also be suitable.

It will be appreciated that an improved aerosol actuator featuring a two-piece construction comprising an operating cap and a base cap having the ability to rotate between an open position and a closed position has been presented. While the present invention has been described with regards to a particular embodiment, it is recognized that additional variations of the present invention may be devised without departing from the inventive concept.

What is claimed is:

1. An aerosol actuator for actuating an aerosol valve, operable via tilting action, for dispensing an aerosol product from an aerosol container, comprising:

an operating cap having a longitudinal axis and a base cap having a longitudinal axis, the base cap being mountable on the aerosol container, the operating cap being mountable on the base cap, the longitudinal axis of the operating cap being coincident with the longitudinal axis of the base cap when the operating cap is mounted on the base cap;

the operating cap being connectable to the aerosol valve and rotatable relative to the base cap between an unlocked position for actuating the aerosol valve and a locked position wherein operation of the aerosol valve is prevented;

wherein the operating cap is configured with at least two fins rotatably positionable over at least two blocking surfaces formed as cutouts within a cylindrical side wall of the base cap or at least two slots formed as cutouts within the cylindrical side wall of the base cap;

wherein rotation of the operating cap to the locked position, positions the at least two fins over the at least two blocking surfaces of the base cap and thereby prevents tilting of the operating cap; and wherein rotation of the operating cap to the unlocked position, positions the at least two fins over the at least two slots of the base cap and thereby allows tilting of the operating cap sufficiently to open the aerosol valve.

2. The aerosol actuator according to claim 1, wherein one of the at least two slots is disposed adjacent to each of the at least two blocking surfaces.

3. The aerosol actuator according to of claim 1, wherein when the operating cap is mounted on the base cap, the at least two blocking surfaces, at least two slots and at least two fins are radially spaced about the coincident longitudinal axes and the radial spacing between the at least two blocking surfaces, at least two slots and at least two fins is the same.

4. The aerosol actuator according to claim 1, wherein each of the at least two fins has a height above a plane coincident with a lower circumference of the operating cap and one of the at least two fins is a front fin and another is a rear fin, the front fin having a height less than the rear fin, wherein downward force applied to the operating cap causes tilting of the cap due to the height differential between the front and rear fins, when the operating cap is rotated such that the at least two fins are positioned above the at least two slots.

5. The aerosol actuator according to claim 1, wherein each of the at least two blocking surfaces includes a plurality of locking protrusions formed on a top of each blocking surface, the plurality of locking protrusions being engageable with one of the at least two fins, when the operating cap is rotated such that the at least two fins are positioned above the at least two blocking surfaces.

6. The aerosol actuator according to claim 1, wherein each of the at least two fins of the operating cap extend radially outwardly from the longitudinal axis.

7. The aerosol actuator according to claim 1, wherein the operating cap includes a flow passage, free of internal obstructions, connectable to the aerosol valve at one end and having a dispensing orifice at another end.

8. The aerosol actuator according to claim 1, wherein at least one of the at least two blocking surfaces includes a stop surface which engages one of the at least two fins and prevents further rotation of the operating cap at one end of the blocking surface.

9. The aerosol actuator according to claim 1, wherein at least one of the at least two slots includes a stop surface which engages at least one of the at least two fins and prevents further rotation of the operating cap.

* * * * *